United States Patent

Aigbogun

(10) Patent No.: US 7,445,150 B2
(45) Date of Patent: Nov. 4, 2008

(54) PRE-PAID CREDIT CARD

(76) Inventor: Bernadette Aigbogun, P.O. Box 585, Bronx, NY (US) 10461

( * ) Notice: Subject to any disclaimer, the term of this patent is extended or adjusted under 35 U.S.C. 154(b) by 0 days.

(21) Appl. No.: 11/357,858

(22) Filed: Feb. 21, 2006

(65) Prior Publication Data

US 2007/0194107 A1 Aug. 23, 2007

(51) Int. Cl.
*G06F 7/08* (2006.01)
(52) U.S. Cl. ........................... 235/381; 235/380
(58) Field of Classification Search .......... 235/380, 235/381, 382, 383, 385, 486, 487, 492
See application file for complete search history.

(56) References Cited

U.S. PATENT DOCUMENTS 5,477,038 A * 12/1995 Levine et al. ............... 235/380
5,663,546 A * 9/1997 Cucinotta et al. ........... 235/379
5,943,423 A * 8/1999 Muftic ......................... 705/67
6,820,803 B1 11/2004 Browning et al.
6,892,187 B2 5/2005 Phillips et al.
6,915,277 B1 7/2005 Manchester et al.
6,941,279 B1 * 9/2005 Sullivan ....................... 705/35

* cited by examiner

*Primary Examiner*—Daniel St. Cyr

(57) ABSTRACT

A method of acquiring goods and services using a pre-paid credit card, issued by either merchants in any network of merchants or service providers, a bank card network or a financial institution, credit card companies and a system for settling a used amount with the pre-paid credit card. A method of banks and financial institutions offering for sale at retail locations, pre-paid credit cards in any amounts the banks and financial institutions deem fit and make available for sale to the public. The Pre-Paid Credit Card does not access cash using the ATM.

12 Claims, No Drawings

PRE-PAID CREDIT CARD

BACKGROUND OF THE INVENTION

The invention is related to a credit card system and in particular to the implementation of a pre-paid credit card system including the creation and usage of a pre-paid credit card and the offering for sale at retail locations pre-paid credit cards in any amounts the card issuer may deem fit.

Already in use are three types of consumer credit cards and pre-paid calling cards. There are: (a) bankcards issued by a bank or other financial institution typical examples of which are MasterCard®, and Visa® cards; (b) a charge card such as issued by American Express® in a series; and the private label cards issued by merchants like Macy's, Best Buy, the Home Depot and so on. Some are issued and serviced by the merchants and some are issued and serviced by financial institutions.

The bankcards allow users to purchase goods and services and charges can be paid off monthly or have a portion paid monthly with remaining balance subject to interest. Some financial institutions may charge annual fees. There are different levels of these cards ranging from a standard card, to a Gold Card or Platinum Card with different annual charges and services. The credit provider sets a dollar amount limit depending on the credit worthiness of the cardholder. The merchant pays an interchange fee based on a percentage of the amount of the individual charge.

The charge card is a card such as the American Express® series of cards. They allow the user to charge purchases and services to the account. The charge balance is expected to be paid in full monthly. There is therefore no interest charged. The purchase limit on such a card is usually not geared to any amount but based on the user's usage history. The cardholder pays an annual fee and the merchant also pays a fee similar to the interchange fee based on the level of purchases.

The private label card is issued and serviced by and on behalf of a merchant such as Best Buy, Macy's and the Home Depot by a financial institution. Some of these private label merchants also issue and service their own cards. The transaction works very similar to a bankcard. The usage is usually limited to the merchant issuing the credit card. The user pays monthly charges or interest on the unpaid balance as with the bankcard. The merchant pays the financial institute a fee similar to the interchange fee paid for a bankcard, though lower.

The cards issued by private label merchants usually pay a higher interest rate than holders of bankcards. Merchants prefer not to pay the higher interchange fees associated generally with available bankcards or the American Express card.

There is a need for a pre-paid credit card that affords the consumers a chance to avoid high credit card interest, being limited in their credit line and the merchants are assured of hassle-free payments because pre-paid credit cards have the same value as instant cash. The pre-paid credit card also affords the user, a unique chance of having access to a credit card without having his or her credit history or the lack of it stand in the way. The user puts up his or her money and therefore is not subject to lenders' rules and regulations.

SUMMARY OF THE INVENTION

The main purpose of this present invention is to provide an opportunity for consumers with no credit, bad credit or poor credit to have access to credit cards. It will also allow parents to control their children's spending habit by giving them pre-paid credit cards. Also to benefit from this present invention, are Corporations, Businesses, Government offices, students and teenagers.

The present invention will allow big businesses and Corporations the chance to control the spending of their staff away on business trips or conferences through the use of pre-paid credit cards. Currently employees of government, corporations or big businesses are issued credit cards with no cash limit. This has often resulted in these employees using the credit cards over and beyond the level their employers never intended. A pre-paid credit card will eliminate all of that. Pre-paid credit cards will have cash limits on them because the value of the cards will depend on the cash limit on the cards. Employees therefore cannot exceed the cash limits on the pre-paid credit cards. Employers cannot be called to verify or extend such cash limits.

In like manner, a Government office can control the spending habits of its employees on business trips or conferences by giving them pre-paid credit cards with a cash limit.

Students in university campuses or high schools can learn financial responsibility and limit their spending habits through the use of a pre-paid credit card. Teenagers can also learn financial responsibility and limit their spending habits through the use of a pre-paid credit card. Currently, teenagers use pre-paid cell phones to limit time and money spent on cell phone usages.

This present invention can also be used as gift cards. The Pre-Paid Credit Cards can be used everywhere ordinary credit cards are accepted. Currently, gift cards are only accepted at particular business or merchant locations where the issuing source designates. These gift cards cannot be honored anywhere else. The gift cards can only be used to purchase goods and not services according to current practice. The pre-paid credit card will be used to purchase goods and services. The pre-paid credit card can also be used as cash since withdrawal can be made against the balance available on the card.

The present invention can be useful on the International market, for example in third world countries where the concept and use of credit cards is relatively unknown. The pre-paid credit card can be used in place of the BTA—Basic Traveling Allowance or Travelers' Checks. Currently, travelers from third world countries e.g. African countries are required to carry a certain amount of money as BTA. With a pre-paid credit card, the BTA or the Travelers' Checks will become obsolete or unnecessary.

Currently, people from African countries on business trips to western countries carry huge amounts of cash on them. The pre-paid credit card will eliminate all of that. The pre-paid credit card is a smart way for the concept and use of the credit card to be introduced to countries in third world countries.

There are two parts to the pre-paid credit card system, (a) the creation of a pre-paid card and (b) the usage of the card.

(a) The creation begins with the receipt of an application for a pre-paid credit card by a bank or financial institution. The issuing bank or financial institution then approves the pre-paid credit card in the amount the user has requested, after a careful examination of pertinent information provided. The pre-paid credit card is then issued to the user by the bank or financial institution. The credit limit will be based on the amount requested by the customer. However, the total amount paid by the customer will be the credit amount plus the handling fees. The bank or financial institution will determine the handling fees which will be paid as part of the process.

The payment for the pre-paid credit will be through a checking or savings account in the bank or by cash, money order or check to any other financial institution where the user may not have a bank account.

There will be no monthly statements issued to customers by the banks or financial institutions except when a request is made for one. This only applies to cards with small cash limits.

The reverse is the case regarding Corporations, big businesses and government offices which may have monthly statements mailed to them for their financial record and accountability.

The situation where-by a statement may be mailed out to the customer involves when customers apply directly to the bank or financial institution for the pre-paid credit card. This is the method advised for customers requesting huge amounts, as well as big Corporations, businesses and government offices.

The second part is when banks and financial institutions on their own make available in the market, pre-paid and pre-packaged cards in various amounts that can be bought in shopping outlets, stores, retailers and anywhere commerce takes place. These generally will carry cash limits of any amount. This class of pre-paid credit cards will be sold in retail stores like pre-paid phone cards, gift cards or subway cards in cities where the subway systems currently operate.

The present invention calls for the pre-paid card to be discarded when the cash is fully used up. This present invention does not call for a re-fill of the pre-paid credit card. The customer therefore can buy or pay for as many cards as he or she wishes and in any amount as well.

There is no credit check required with the pre-paid credit card. The need for a check is removed since it is the user/customer who is putting up his money for the card, hence it is called pre-paid.

The non-credit check is one of the most beautiful things about the pre-paid credit card. This is one of the reasons the system will appeal most to customers/users.

Activation of the pre-paid credit cards will be either by phone for cards purchased at the banks or financial institutions or by identification numbers, which will be inscribed on the back of the cards sold in retail stores. Should this be cumbersome for banks and financial institutions, an activation phone number could be provided so that the user could call with the account number on the card. Only after the activation call is made from a home, office or cell phone of the user, can the card be activated.

The present invention calls for an expiration date to be placed on the pre-paid credit cards.

There will be no interest charged on the pre-paid credit card since the customer is using his or her own money to buy the credit cards. However, handling fees will be charged by the issuing banks and financial institutions.

The present pre-paid credit card can be used as gift cards and given by the customer to whom so ever he or she desires. The pre-paid credit card will be acceptable where ever regular credit cards are accepted.

(b) The user may make a purchase of goods or services with the pre-paid credit card and at any location accepting bank or credit cards. The location may be independent merchants or any network of merchants physical or an internet site. When a purchase is made at a merchant location, the processing of the pre-paid credit card is done via any network of merchants processing channels. The channel's exchange fee is paid as part of this process. The cooperating bankcard back office operation processes the non-merchant purchase as a bankcard purchase. This is more so in third world countries where merchants in some remote locations will have to deposit the accepted pre-paid credit cards in their bank accounts. An important advantage of the pre-paid credit card is that it can be used at any location where a regular credit card is accepted.

A purchase at a private-label merchant location is processed by the private-label back office operation which then feeds the transmission to the bankcard issuer or subsequent processor. The transaction is then incorporated into the card balance. If the pre-paid credit card is used to purchase services, such purchases will be processed through the major credit cards Networks. The necessary exchange fee will be paid as part of the process. The transaction is processed by the cooperating bankcard back office as a bankcard service purchase. The pre-paid credit card will work like the regular credit card. The major difference is that the regular card has a credit line approved and provided by the issuer, while that of the pre-paid card is based on the user's own money. The pre-paid credit card only replaces personal cash or checks.

The issuers of the pre-paid credit card do not have to provide monthly statements to their customers. Statements can be provided on demand only basis—in times of sale disputes and for accounts with large Corporations, government offices and businesses. That will be the job of customer service—to provide information in times of sale disputes to customers or when cards are reported lost or stolen.

All purchases on pre-paid credit cards will have a moratorium of at least two weeks before full payment is released to the merchant. This is to minimize fraud especially if the card is reported lost or stolen.

Users of pre-paid credit cards will report loss of their cards immediately to the issuers so a stop payment can be placed on them after which the cards will be canceled. The issuing bank or financial institution can then replace the cards for Corporations, businesses and government offices. The balance amount on the cards which were bought in stores will then be refunded to the customers by the issuers.

Any user who fails to comply with the above will be responsible for the loss, since a stop payment could not be placed on the card.

Banks and financial institutions issuing pre-paid credit cards will further provide their own rules and regulations on their usages.

DESCRIPTION OF THE PREFERRED EMBODIMENT

The pre-paid credit card comes in two parts: (a) a pre-paid card issued by a bank or financial institution to a customer or user who made a request for one, (b) pre-paid credit cards made available to the general public by banks or financial institutions and sold in retail outlets.

The pre-paid credit card is issued with a single account number and can be accepted in places of commerce where regular credit cards are.

The pre-paid credit card will be activated in one of two ways: (a) the card issued by the bank or financial institution to a user after a request is made, will be activated when the user calls an activation phone number provided by the bank or financial institution. The call can be made from a home, office or cell phone, depending on the information supplied by the user. This pre-paid card can be used like the regular credit card which is verified by the customer's signature.

(b) The second way to activate the pre-paid credit card made available to the general public and sold in retail outlets is either by calling a phone number provided for that purpose by the issuing bank or financial institution, or by an identification number encrypted on the back of the card by the issuer of the card. The issuing bank or financial institution will determine the method most suitable to them.

In case of a loss or theft, the card holder will call the issuer of the card so that a stop or cancellation can be placed on it. For the card issued by the bank or financial institution, a replacement card can be issued to the user. For the pre-paid credit cards sold in retail outlets, a refund of the remaining balance will be sent to the user based on the information supplied by him or her.

The pre-paid credit card can be purchased for a dollar amount from the bank or financial institution with cash or through money in a savings or checking account and for the pre-paid cards offered for sale through retail stores, cash or debit bank cards. After this transaction, the card is then mailed to the user. For the user to be able to use the card, the pre-paid credit card will have to be activated via a telephone number provided for that purpose by the issuer of the card.

The user can then use the card to purchase goods or services at any merchant or services physical location or Internet site where such cards are accepted. The user can use the card just the same way the standard credit card or gift card is used. When the pre-paid credit card is presented, the sales rep swipes it in an in-store card reader to debit the purchase amount from the cash amount on the card. The purchase amount is then electronically debited from the account balance. The issuing bank or financial institution keeps a record of all the transactions on the card.

The purchase charge is sent on to a cooperating bankcard back office operation for further processing including statements and normal customer service, collections and settlement matters. The monthly statements are sent only to Corporations, Businesses and Government offices. For the users of pre-paid credit cards bought from retail stores, statements may only be mailed out in times of sales disputes or when the user requests for one, especially if the users' complaints have not been completely resolved. However, the card issuers can modify this section to make implementation possible and feasible.

If the purchase is within the available cash limit on the pre-paid credit card, it is processed through the network of merchants processing operation including paying an exchange fee. The purchase on the network of merchants is paid to the merchant minus the exchange fee.

If the balance amount on the card is not sufficient to pay in full the amount of the purchase, the merchant has a choice of either denying the purchase, or asking the user to make up the balance by cash. Otherwise, the transaction ends if the balance on the pre-paid credit card is not sufficient to meet the purchase amount.

The pre-paid credit card is an invention that will benefit society. It is not only an idea that can help the poor, the rich, as well as business people will also reap its benefits.

The most obvious advantage is that a pre-paid credit card eliminates the need for a credit check which is the Achilles' heels when it comes to getting approved for credit. With the pre-paid credit card, the cardholder determines the cash limit and purchases one accordingly. The pre-paid credit card holder will no longer live above his or her means. The cash limits on the cards will depend on whatever the cardholder can afford or wants.

The pre-paid credit card will bring a new horizon to the concept and use of the credit card. The pre-paid credit card will bring the use of credit card to the general populace all over the world, to more people who otherwise would never have access to credit cards. This is one of the beauties of the invention, widespread use of the credit card.

The pre-paid credit card will also allow anyone with no credit or poor credit history to build it up again. Though the user provides the cash on the card, the issuing banks or financial institutions will monitor the purchases and usages to determine if these people could be approved for credit.

The pre-paid credit card will aid Corporations, businesses and Government offices to monitor and eliminate wasteful spending on the part of their staff on business trips or official conferences. Currently, staff on business trips or conferences, tend to over spend and go over the cash limit on their companies' credit cards.

This present pre-paid credit card invention will also help parents to control their children's spending habit. Giving them pre-paid credit cards will eliminate the current practice of parents giving their children credit cards with no spending or cash limits, rather depending on these children to be prudent in their spending. Experience has shown that these children spend the money anyway.

The present invention will also help teenagers, students in high schools or colleges to learn financial responsibility and use money wisely. Currently teens and students use the pre-paid cell phone to cut down on usage and cost. Knowing that they have a cash limit on their credit cards will help them to learn to prioritize.

This invention will also help to shut down the practices of fraudulent people or businesses who bilk people with poor or no credit history out of hundreds of thousands or millions of dollars every year by offering them credit cards which never materialize. Now all they need to do is apply for a pre-paid credit card in any amount they can afford.

The present invention will make credit cards more readily available to consumers, due to the fact that pre-paid credit cards in small amounts will be made available for purchase at retail stores.

On the International scene, the pre-paid credit card will help to introduce the concept and use of the credit card to people in third world countries. The pre-paid credit card may be used in place of travelers' checks or traveling allowances which people from third world countries use while traveling to the West.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

The invention claimed is:

1. A pre-paid credit card method of purchasing goods and services using a pre-paid credit card, consisting of a single account number without a magnetic stripe where card is activated during first use of card by entering an access code consisting of a phone number and a PIN, the pre-paid credit card, comprising:

a master data source for storing the pre-paid credit card number and balance information of the pre-paid credit card issued to or purchased by the user and managing the same;

a pre-paid credit card connected to the master data source for authenticating the pre-paid credit card, settling the balances from the balance information of the corresponding card number of the pre-paid credit card through inquiry to the master data source when a request for settlement is received through the merchant;

receiving, by a goods and/or services provider a pre-paid credit card information to be used to purchase an item or service, said pre-paid credit card information including a single number identifying a single account associated with said pre-paid credit card;

determining, based on said single account number, that said single account number is a pre-paid credit card and a transaction using the said pre-paid credit card is able to be processed over a network of merchants and a bank card network;

determining the identity of the said merchant or service provider;

processing such transaction and transmitting said single account number using one of said network of merchants, bank card network and non network merchants through the master data source based on the identity of the said merchant or service provider.

2. The pre-paid credit card method according to claim 1, includes applying a transaction fee if said transaction is processed using said network of merchants.

3. The pre-paid credit card method according to claim 1, wherein said merchant or service provider belongs to a network of merchants or providers of services and said transaction is processed using said network.

4. The pre-paid credit card method according to claim 1, wherein said merchant or service provider is not a member of said network of merchants or service providers and such transaction is processed using said bank card network.

5. The pre-paid credit card method according to claim 1, wherein a bank card transaction fee is applied if said transaction is processed using said bank card network.

6. The pre-paid credit card method according to claim 1, further comprises processing said transaction through banking operations.

7. The pre-paid credit card method of claim 1, wherein said processing of said transaction includes at least one of generating customer service, collections and settlement.

8. The pre-paid credit card method of claim 1, wherein said single pre-paid credit account has no interest rate but a single credit line.

9. The pre-paid credit card method of claim 8, wherein said single pre-paid credit line has all portion available for purchases at said network of merchants or service providers' locations.

10. A payment method for conducting a transaction using a pre-paid credit card, the method which comprises:

receiving a request to complete a transaction, from a merchant or service provider, in a remote location and not being a member in a network of merchants or service providers, pre-paid credit cards already accepted from customers in said remote location, and such information identifying a pre-paid credit card to have been used to purchase an item or pay for services, said pre-paid credit card information including a credit card account number;

determining, based on said pre-paid credit card account number and identification code, that a transaction using said pre-paid credit card is designed to be routed over the network of merchants or service providers and a bank card network;

accepting the pre-paid credit cards; and completing the transaction by processing said transaction using one of said network of merchants or service providers or said bank card network and for further processing by a cooperating bank card back office operation coupled to process said transaction received from said network merchants or service providers and members of said bank card network, wherein said activation code is consisting of a phone number and a PIN.

11. The method of claim in 10, further comprises:

the bank after the acceptance of the pre-paid credit cards from said merchant or service provider from a remote location who is a non-member of said network of merchants or service providers, completes the transaction by determining that said merchant or service provider is not a member of said network of merchants or service providers and said determination that the credit card is a pre-paid credit card, is capable of being processed over both bank card network, a private label network or any a network of merchants, processes said transaction using said bank card network.

12. A system for buying pre-paid credit cards from retail locations which comprise: an offer for sale at retail locations, pre-paid credit cards in amounts to be determined and made available by the issuing banks or financial institutions, wherein the pre-paid credit includes an activation code consisting of a phone number and a PIN, an offer by a user to purchase said pre-paid cards by going to the retail locations;

receiving by the retailer of the pre-paid credit card, payments for said cards from the card purchaser;

the user purchasing such pre-paid credit card in the amount made available for sale at the retail location;

the user prior to using the pre-paid credit card checks for the bank assigned identifying code on the back of the card;

the user presenting the pre-paid credit card to a merchant to make a purchase for goods or services, the merchant inputs the bank assigned identifying code on the back of the pre-paid credit card to access information on the pre-paid credit card in a data source;

receiving, by a merchant or service provider in said network of merchants or service providers, a pre-paid credit card information identifying a pre-paid credit card to be used to purchase an item or pay for services, and said pre-paid credit card information including a credit card account number;

determining, based on said pre-paid credit card account number, that a transaction using said pre-paid credit card is designed to be routed over the network of merchants or service providers and a bank card network;

processing said transaction using one of said networks of merchants or service providers and said bank card network based on an identity of said merchant or service provider and for further processing by a cooperating bank card back office operation coupled to process a transaction received from said networks of merchants or service providers and said bank card network; and a settlement system connected to a data source and the pre-paid credit card system for authenticating said card, settling the authenticated pre-paid credit card balances from the balance information of the corresponding card number of the pre-paid credit card by inquiry to the master data source through the pre-paid credit card system when a request for settlement is received through said networks of merchants or service providers or bank card networks.

* * * * *